(12) United States Patent
Schlachter (10) Patent No.: US 7,377,184 B1
(45) Date of Patent: May 27, 2008

(54) MULTIPURPOSE CENTRALIZED FLOW DETECTOR

(76) Inventor: Raymond W. Schlachter, 327 21st St., Brooklyn, NY (US) 11215

( * ) Notice: Subject to any disclaimer, the term of this patent is extended or adjusted under 35 U.S.C. 154(b) by 0 days.

(21) Appl. No.: 11/702,775

(22) Filed: Feb. 6, 2007

(51) Int. Cl.
*G01F 1/22* (2006.01)
(52) U.S. Cl. .............................. 73/861.53; 340/870.01
(58) Field of Classification Search .............. 73/861.53, 73/273; 235/379, 440, 439; 340/870.02, 340/870.03, 870.01
See application file for complete search history.

(56) References Cited

U.S. PATENT DOCUMENTS

| | | | |
|---|---|---|---|
| 3,875,406 A * | 4/1975 | Holeman | 250/231.13 |
| 5,214,587 A | 5/1993 | Green | |
| 5,228,329 A | 7/1993 | Dennison | |
| 5,252,967 A * | 10/1993 | Brennan et al. | 340/870.02 |
| 6,317,051 B1 | 11/2001 | Cohen | |
| 7,042,368 B2 | 5/2006 | Patterson et al. | |
| 7,152,783 B2 * | 12/2006 | Charrin | 235/379 |
| 2004/0263352 A1 * | 12/2004 | Cornwall et al. | 340/870.02 |
| 2005/0007260 A1 * | 1/2005 | Winter et al. | 340/870.01 |

* cited by examiner

*Primary Examiner*—Jewel Thompson
(74) *Attorney, Agent, or Firm*—Mark Levy; Hinman, Howard & Kattell (57) ABSTRACT

A non-intrusive flow detector consists of an optical sensor assembly that attaches non-obstructively and non-invasively to a fluid flow meter. The sensor monitors dial movement of a least flow dial or wheel and generates an electrical signal representative of a flow through the meter. Electrical circuitry having an adjustable timing circuit is used to selectively detect either excessive flow during a predetermined time period or the absence of flow after a predetermined time period. The electrical circuitry is adapted to connect to an existing alarm system and may be housed either near the meter in a separate enclosure or placed in an existing alarm panel.

17 Claims, 9 Drawing Sheets

MULTIPURPOSE CENTRALIZED FLOW DETECTOR

FIELD OF THE INVENTION

The invention relates to fluid flow detectors for detecting unusual flow volumes and, more particularly, to a non-invasive detector that attaches to existing meters to alert property owners of unexpectedly high or low fluid flow volumes measured by the meters.

BACKGROUND OF THE INVENTION

Leaks or other unusual events that cause extraordinary flow volumes in piping systems unnecessarily cost residential and commercial property owners money. In addition, leaking water can cause large amounts of damage to a home or commercial space. Water is typically expensive; high utility bills may result from excess or wasted usage. In addition, the growing scarcity of potable water motivates reducing or eliminating waste.

Water damage resulting from leaks can cost property owners or insurance companies additional expense. A detector that monitors fluid flow volume and alerts owners, authorities, insurance companies, or a central station when unusual volume is detected may reduce overall utility usage, as well as unnecessary damage and expenses caused by water leaks. Additionally, a small, easily installable, easily operable detector will encourage and facilitate use by property owners.

Many current flow meters that measure flow by automatically reading meters are bulky, are designed for technician use only, and do not alert owners to unusual flow volumes. Rather, they merely report actual consumption. Utility meters are often located inaccessibly. For this reason, and to reduce field personnel, utility companies, for instance, find advantage in automatically reading meters electronically, and transmitting the reading, such as by radio waves.

U.S. Pat. No. 7,042,368, issued May 9, 2006 to Patterson et al., discloses an automated meter reader to report utility consumption. A device and method of use are described having an optical transceiver that emits light toward a meter face, an optical receiver that accepts light reflected off the meter face, and an amplifier and gain control as part of a signal processing circuit. Patterson et al. do not disclose any means to continuously monitor for unusual flow rates. The meter reader is also obtrusive, blocking ordinary visual inspection of the meter during use. The detector is not designed for property owner use.

U.S. Pat. No. 5,214,587, issued May 25, 1993 to Green, also discloses a device for monitoring utility usage. A meter sensor assembly is attached to a meter and a user interface unit with LCD display processes the sensor signal into useful data. This device is less bulky and obtrusive than that of Patterson et al., but it is built to read only meters with rotating discs. Again, it reports consumption, but does not automatically alert a user or other party to unusual usage volumes.

Presently available flow detectors that do alert owners to unusual flow volumes are invasive to the meters and piping systems, bulky, and unwieldy for typical owners to install and operate. Whereas automatic meter readers are somewhat non-invasive, leak detectors typically use invasive means such as valve or pipe add-ons. Other detectors use non-centralized systems that do not detect flow starting at the meter where the piping system begins.

U.S. Pat. No. 6,317,051, issued Nov. 13, 2001 to Cohen, discloses an invasive flow monitoring device mounted in series with a water pipe, a controller, logic components, and a shut-off valve to shut off water flow when a predetermined condition is met. No meter is read, and actual modifications to existing piping systems must be made.

U.S. Pat. No. 5,228,329, issued Jul. 20, 1993 to Dennison, discloses a leak detector that uses a series of thermal fluid flow sensors. These sensors detect leaks indirectly by comparing variations in pipe temperatures caused by variations in flow rate. When leaks are detected, a chime and light emitting diode are activated.

It would be advantageous to provide a centralized flow detector to detect flow rates from the beginning throughout an entire piping system.

It would also be advantageous to provide a fluid flow detector that continuously monitors the dials on a meter for unusual flow volume.

It would further be advantageous to provide an easily installable, easily operable fluid flow detector to facilitate use by a property owner.

It would also be advantageous to provide a fluid flow detector with a sensor assembly mechanically adjustable in three planes.

It would further be advantageous to provide a fluid flow detector capable of alerting property owners, authorities, insurance companies, or central stations of unusual fluid flow rates.

It would also be advantageous to provide a non-invasive fluid flow detector that requires modification to neither existing piping systems nor existing meters.

SUMMARY OF THE INVENTION

The present fluid flow detector consists of two main elements: an optical sensor assembly attached non-obstructively to a meter for monitoring dial movement and generating electrical signals, and a logic board that can be housed in a small enclosure, or docked in an existing alarm panel, processing the electrical signals and determining whether to activate an alarm device of choice. The detector works with any piping system having a central meter with a dial. Such piping systems include, but are not limited to those containing water, oil, gas, liquid gas, and gasoline.

BRIEF DESCRIPTION OF THE DRAWINGS

A complete understanding of the present invention may be obtained by reference to the accompanying drawings when taken in conjunction with the detailed description thereof and in which.

For purposes of brevity and clarity, like components and elements of the apparatus of this invention will bear the same designations or numbering throughout the FIGURES.

DETAILED DESCRIPTION OF THE PREFERRED EMBODIMENT

Figure 1:
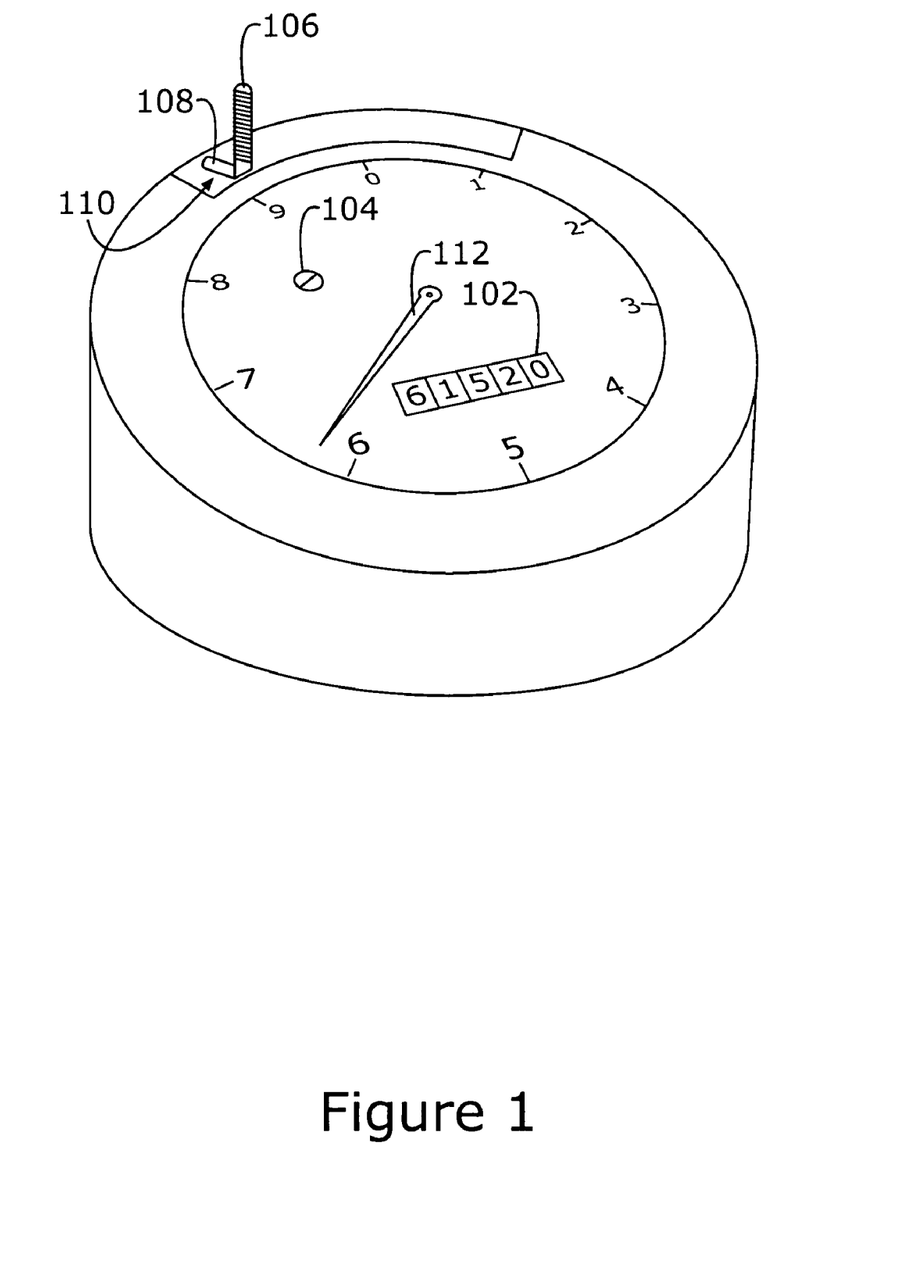
FIG. 1 is a top, perspective, schematic view of the face of a typical utility meter having means for attaching a sensor assembly installed thereupon.

Referring first to FIG. 1, there is shown a top perspective view of a typical water meter, generally at reference number 100. While a water meter 100 is used for purposes of disclosure, the inventive system and method may be applied to other fluids. Consequently, the invention is not limited to water meters but includes flow monitoring of any fluid. Meter 100 typically has several features visible on its face. A meter readout 102, typically consisting of a series of display wheels, provides a cumulative reading of the volume of fluid passing through meter 100. Meter 100 typically includes a small flow indicator needle or wheel 104 that typically revolves relatively rapidly as fluid flows through meter 100. The inventive flow monitoring system relies on monitoring the movement of small flow indicator 104.

A threaded stud 106 having a lower mounting portion 108 is affixed to the face of meter 100, typically using an adhesive applied to a lower surface 110 of lower mounting portion 108. It will be recognized that any suitable method including, but not limited to, welding, gluing, fastening by a hook-and-loop fastening arrangement, magnetically fastening, bolting, clamping, or otherwise attaching may be used to affix threaded stud 106 to meter 100. However, meter readout 102 must not be obscured by threaded stud 106 or mounting portion 108 thereof. Threaded stud 106 may be formed from a stainless steel welding stud known to those of skill in the welding art.

Some meters 100 may have a sweeping hand 112. Sweeping hand 112 is irrelevant to the overall functioning of the inventive flow sensor except for considerations arising from sweeping hand 112 passing between optical sensor assembly 114 (FIG. 2) and small flow dial 104. This potential problem is discussed in detail hereinbelow.

Figure 2:
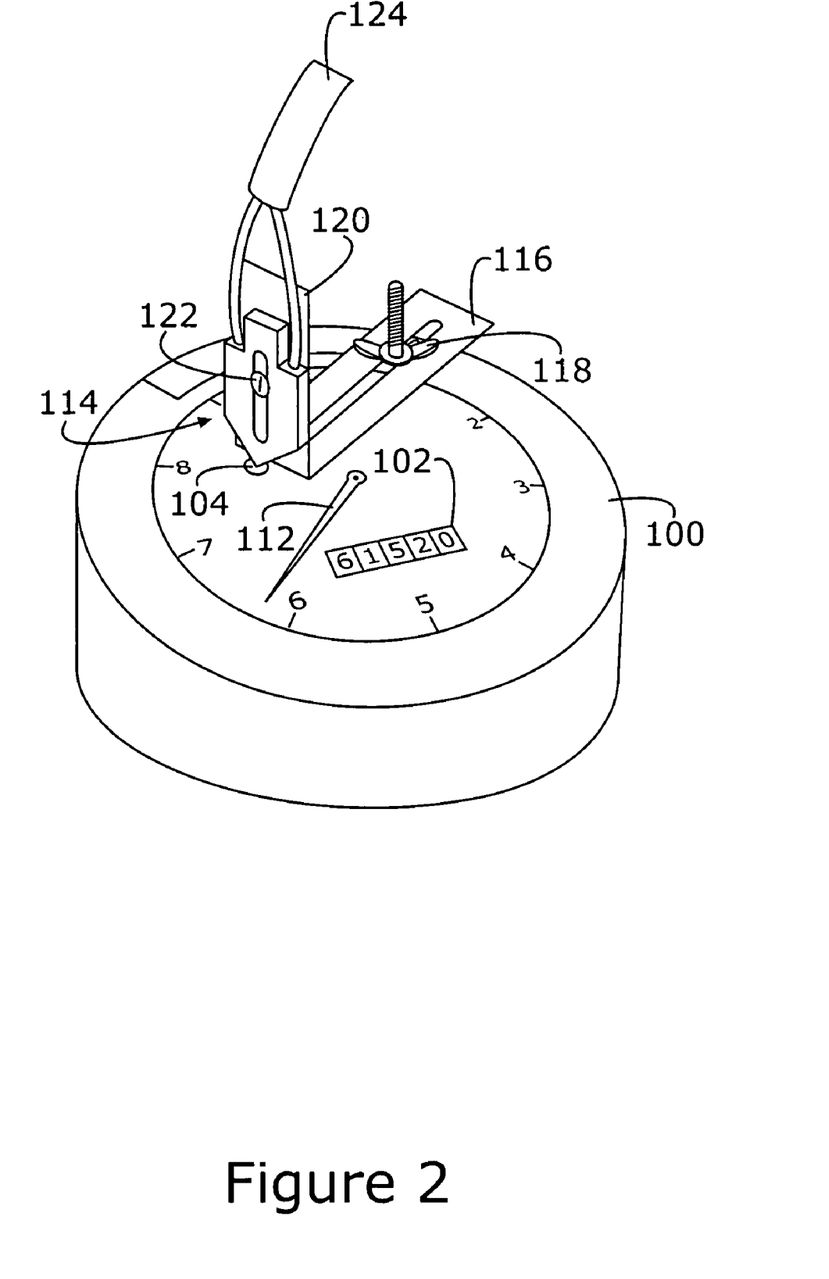
FIG. 2 is a top, perspective schematic view of the meter face of FIG. 1 with a sensor assembly in accordance with the invention installed thereon.

Referring now also to FIG. 2, there is shown a top, perspective view of meter 100 with a sensor assembly 114 mounted to threaded stud 106. A slotted, L-shaped bracket 116 is placed over threaded stud 106 and secured by a wing nut 118 or another equivalent fastening device.

Slotted optical sensor assembly 114 is slidably secured to an upwardly projecting portion 120 of slotted bracket 116, typically by a screw or bolt 122 through a slotted portion of optical sensor assembly 114 into upwardly projecting bracket portion 120. Screw or bolt may be captured by threads, not shown, in a hole, not shown, in upwardly projecting portion 120 of bracket 116. Alternately, a nut or other fastener may be placed on a distal end of screw or bolt 122 thereby securing optical assembly 114 to bracket 116.

A cable 124 carries electrical power and electrical signals to and from optical sensor assembly 114.

Optical sensor assembly 114 is typically a one-piece mechanical assembly containing both a light source (e.g., an LED) and a photo detector (e.g., a phototransistor). The light source shines outwardly from the body of optical sensor assembly 114 to a prefocused spot. Light reflected from an object proximate the prefocused spot is received by the photodetector that, in turn, generates an electrical signal representative of the magnitude of the reflected light thereof. The operation of optical sensor assembly 114 is described in detail hereinbelow.

Figure 3:
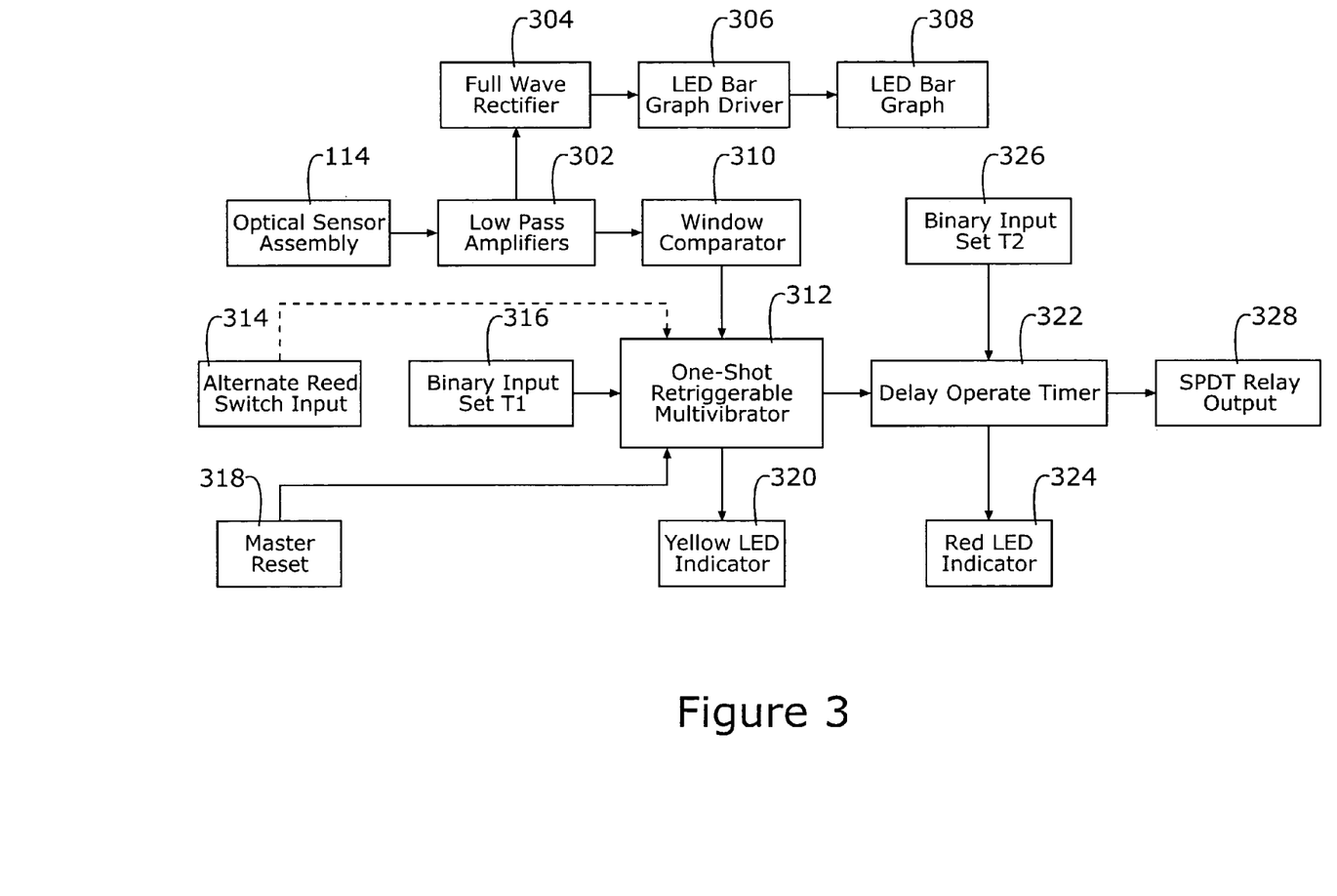
FIG. 3 is a high-level, system block diagram showing the components of the fluid flow detector.

Referring now to FIG. 3, there is shown a functional block diagram of the electrical circuitry of the fluid flow detector and monitor, generally at reference number 300.

Sensor assembly 114 (FIG. 2) is connected via cable 124 (FIG. 2) to the input of a low-pass amplifier 302. A first output of low-pass amplifier 302 is connected to a full-wave rectifier 304. An output of full-wave rectifier 304 is connected to an LED bar graph driver 306. The output of LED bar graph driver 306 is connected to an LED bar graph display 308.

A second output of low-pass amplifier 302 is connected to an input of a window comparator 310. An output of window comparator 310 is connected to an input of a one-shot, retriggerable multivibrator 312, often referred to as a single-shot by those skilled in the electrical design arts. In the embodiment chosen for purposes of disclosure, single shot 312 is crystal controlled. It will be recognized by those skilled in the art that numerous other approaches to stabilizing a single-shot may be substituted therefor.

In alternate embodiments of the inventive flow-monitoring device, a reed switch 314 may be included within meter 100 (FIG. 1). Reed switch 314 typically provides a contact closure once per a predetermined number of gallons or cubic feet of flow through meter 100 and may be used to eliminate optical sensor assembly 114 as well as certain electronic components. When used, reed switch 314 is connected to an alternate input of single-shot 312.

A binary input set T1 316 is connected to a set input of one-shot 312. T1 316 typically consists of a series of DIP switches used to set the period of one-shot 312.

A master reset switch 318 is connected to a reset input of one-shot 312.

An LED indicator 320 is attached to an output of one-shot 312. While a yellow LED indicator 320 is chosen for purposes of disclosure, it will be recognized that other indicators and/or colors may be substituted therefor.

The primary output of one-shot 312 is connected to the input of a timer 322.

A second set of DIP switches forming binary input set T2 326 is connected to timer 322. Binary input set T2 326 controls the time setting of timer 322.

An LED indicator 324 is connected to an output of timer 322. While a red LED has been chosen for purposes of disclosure, it will be recognized that other indicator types and/or colors may be substituted therefor.

A relay 328 is connected to a primary output of timer 322. For purposes of disclosure, relay 328 has an s.p.d.t. contact configuration. It will be recognized that other switch configurations, of course, may be substituted for the s.p.d.t. configuration. It will also be recognized that while an electromechanical relay has been chosen for purposes of disclosure, a wide range of triggerable switching devices known to those of skill in the art may be effectively substituted when desired.

Figure 4:
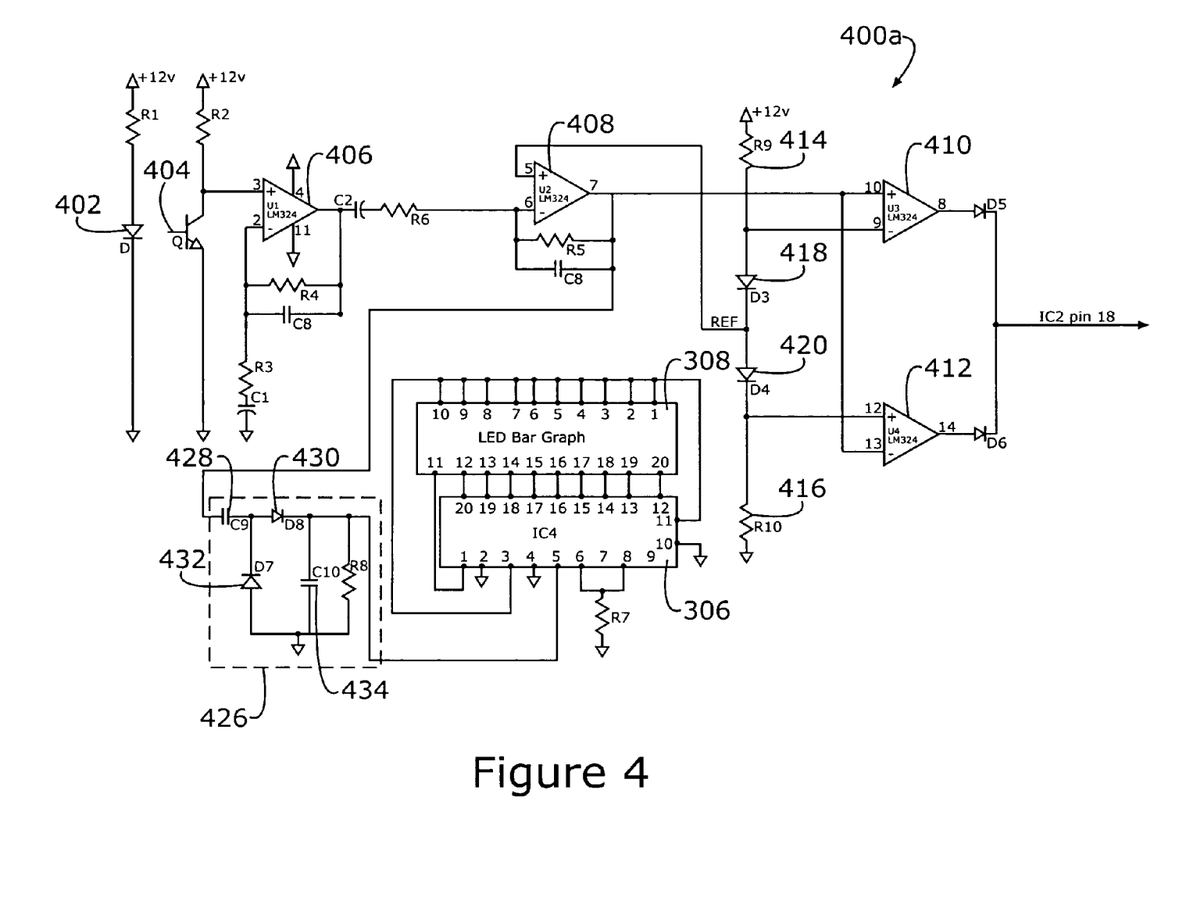
FIGS. 4 and 5, when taken together, are an electrical schematic diagram of the system of FIG. 3.
Figure 5:
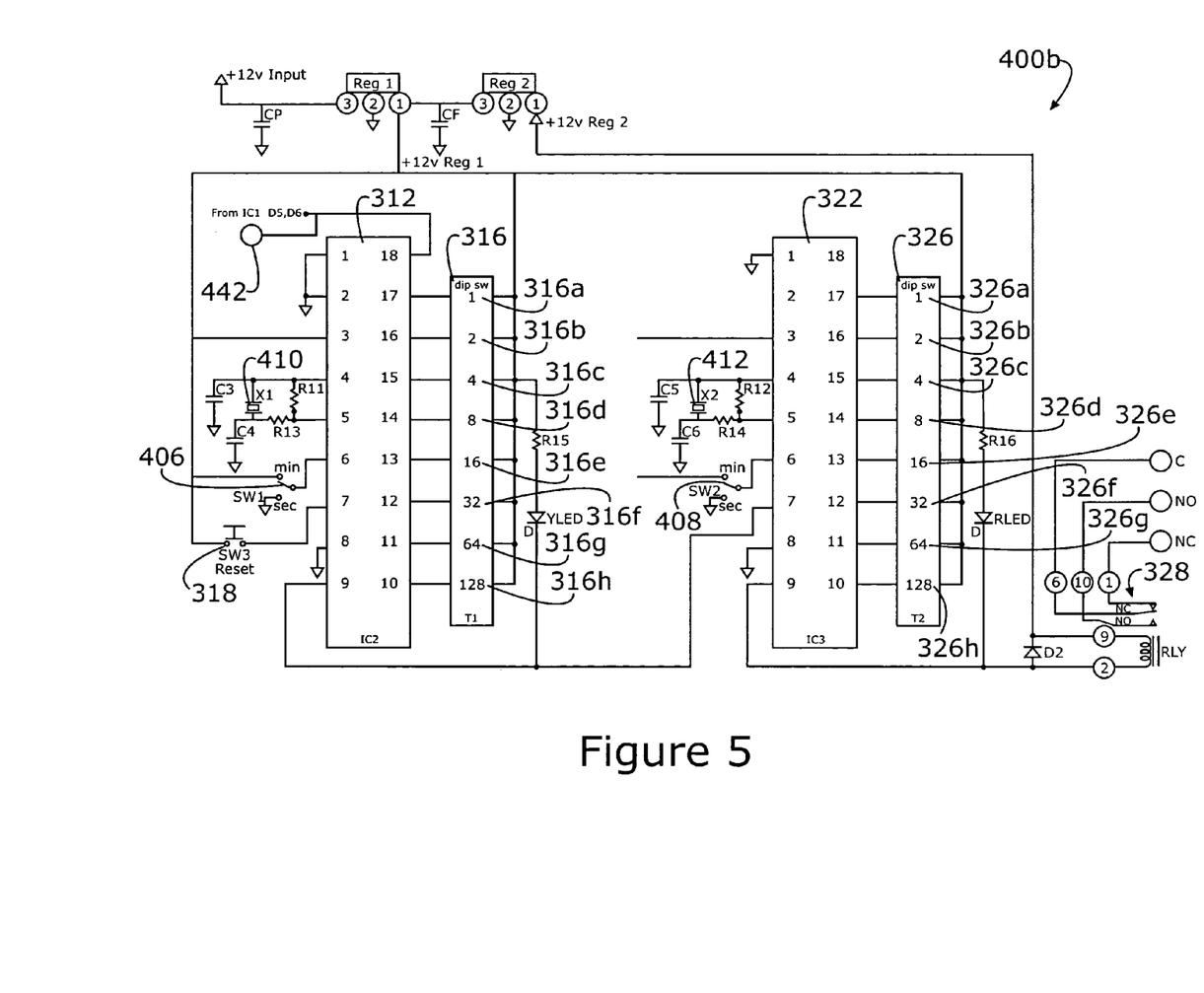

Referring now also to FIGS. 4 and 5, there is collectively shown an electrical schematic diagram of an embodiment of the system of FIG. 3, generally at reference numbers 400a, 400b.

The optical sensor 114 consists of two portions: an infrared light emitting diode (IRLED) 402, and a phototransistor 404, typically provided in a single mechanical package. IRLED 402 and phototransistor 404 are typically held aligned in a pre-focused arrangement to facilitate installation.

Low-pass amplifier 302 is implemented by AC coupled amplifiers 406, 408 and associated circuitry.

Window comparator 310 is implemented by amplifiers 410, 412 and associated circuitry enables detection of increases and decreases in reflected light when the voltage of the generated electrical signal surpasses a predetermined threshold. The imposed threshold reduces false alarms caused by electrical noise, and is set by resistors 414, 416, and diodes 418, 420.

Full-wave rectifier 304 is implemented as a voltage doubler arrangement 426 consisting of capacitors 428, 434, diodes 430, 432 and resistor 436. The output of this arrangement is applied to an LED bar graph driver 306, which controls an LED bar graph indicator 308.

One-shot 312 and timer 322 each have a switch 406, 408, respectively used to determine whether counting is in seconds or minutes.

One-shot 312 and timer 322 each have DIP switch sets 316, 326 respectively, enabling a user to manually program time delays. Each individual switch 316a-316h and 426a-426h represents a binary value. Such arrangements are believed known to those of skill in the art and are not described further herein. Switches 316a-316h and 426a-426h are used to set user-selected time periods for one-shot 312 and timer 322, respectively.

One-shot 312 and timer 322 may be controlled by crystals 410, 412, respectively, appropriately connected to each thereof. It will be recognized by those of skill in the art that other devices and/or circuits may be utilized to provide necessary stability to one or both of one-shot 312 or timer 322. Consequently, the invention is not limited to the crystal controlled time stabilization method chosen for purposes of disclosure.

Figure 6:
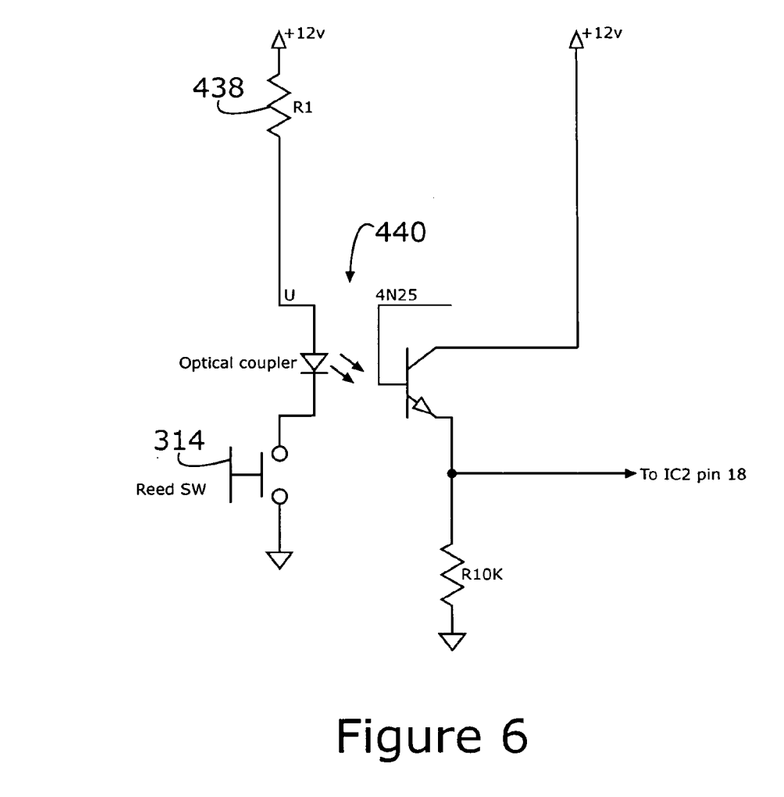
FIG. 6 is an electrical schematic diagram of the optional reed switch interface of the system of FIG. 5.

Referring now also to FIG. 6, there is shown an electrical schematic of an interface circuit that accepts a contact closure from reed switch 314, typically forming part of meter 100 (FIG. 1). A current-limiting resistor 438 is placed in series with a 12 volt DC power source, and optical coupler or opto-isolator 440 and the contacts of reed switch 314. The output of opto-isolator 440 is coupled to the one-shot 312 at contact 442 as seen in FIG. 5. It will be recognized that all circuitry of FIG. 4 may be eliminated in the embodiment using reed switch 314 as an input from meter 100 (FIG. 1).

In operation, the flow monitoring system of the invention accepts an electrical signal from sensor form optical sensor assembly 114. Optionally, a pulse from may be generated by reed switch 314 within meter 100 (FIG. 1) or another external signal source calibrated to flow through meter 100.

The electrical signal from optical sensor assembly 114, more particularly from photodetector 404, is amplified and shaped by low-pass amplifiers 302. The output from low-pass amplifiers 302 is provided to window comparator 310 that acts as a threshold detector. This signal processing provided by low-pass amplifiers 302 and window comparator 310 provides a clean signal responsive to the signal generated by photodetector 404.

An output signal from low pass amplifier 302 is passed to a full wave rectifier circuit 426 that provides a DC signal proportional to the signal from photodetector 404 to the LED bar graph driver 306. LED bar graph driver 306 provides the necessary drive signals to an LED bar graph display 308. LED bar graph display 308 is used primarily to position the optical sensor assembly 114 (FIG. 2) and to calibrate the sensitivity of the flow monitoring system 300 (FIG. 3) to desired flow levels and/or time periods.

The output window comparator 310 also triggers one-shot 312 whose period is set by binary input dip switches 316a-316h. A trigger at the input of one-shot 312 starts a timeout of period T1 determined by the settings of dip switches 316a-316h. During the T1 time period, yellow LED 320 is illuminated. Each pulse from window comparator 310 re-triggers one-shot 312. Consequently, if input pluses are supplied frequently (for example, when flow through meter 100 is high), the output of one-shot 312 remains active.

The output of one-shot 312 also starts delay timer 322. Delay timer 322 has a time period T2 set by binary input dip switches 326a-326h. Delay time 322 operates during the time an input is applied. If an input is still applied at the end of the time period, delay timer 322 generates an output signal. If, however, the input to delay timer 322 is removed prior to the end of time period T2, delay timer 322 is reset and no output signal is generated. Consequently, if the output of one-shot 312 goes inactive prior to the time-out of delay timer 322, no alarm is generated. However, a continued, active state of one-shot 312 after delay time T2 causes an output signal from delay timer 322 to activate relay 328, thereby triggering an alarm.

Assume:

Tp is the time between input pulses from optical sensor assembly 114 (or reed switch 314);

T1 is the time period of one-shot 312;

T2 is the delay time of delay timer 322; and

T2>T1.

With these assumptions if Tp>T1, no alarm is generated. However, if Tp<T1, an alarm is generated.

The difference in time setting between T1 and T2 determines how many Tps (with Tp<T1) are required to cause an alarm. For example, if T2=3×T1, then at least 3 Tps must occur before delay timer 322 generates an output and causes an alarm.

Each model of meter 100 may require a unique calibration to convert pulses-per-second into gallons or cubic feet per minute.

The flow monitoring system of the invention may operate in two different modes. First, as described hereinabove, the system can detect excessive flow. The user need set only dip switches 316a-316h and 326a-326h to appropriate values commensurate with the particular meter upon which optical sensor assembly 314 is installed and the flow at which an alarm is desired.

In an alternate mode of operation, monitoring system 300 can be utilized to provide an underflow alarm. In Applications such as irrigations systems, water flow may be intermittent. However, if flow is not reestablished in a timely manner (e.g., one hour), damage to crops may occur. The inventive flow monitoring system may be utilized to generate an alarm if flow is not reestablished after a predetermined time.

Assume that the normally open (n.o.) contacts of relay 328 are used in an application when overflow is to be detected. In other words, when delay timer 322 finally generates a signal after timeout, the n.o. contacts of relay 328 close, thereby completing an alarm circuit. By setting T1 to, for example, one hour and T2 to zero, as water flows, one-shot 312 is triggered repeatedly and delay time 322 time out immediately activates relay 328 and opens the normally closed (n.c.) contacts thereof. If an alarm circuit is connected to the n.c. contacts, relay 328 remains energized for one hour after the last pulse is received from optical sensor assembly 114. If water flow is reestablished within the one hour time period (T2), relay 328 remains energized and no alarm signal is generated. If, however, flow is not reestablished, at the end of the one hour timeout, relay 328 is deenergized and the n.c. contact closes thereby generating an alarm signal. By adjusting the value of T1 using dip switches 316a-316h any time delay up to approximately 255 minutes (i.e., 4.25 hours) may be programmed.

The circuitry of FIGS. 4, 5 and 6 is typically packaged on a circuit board, not shown, that may be housed in a separate housing disposed near meter 100. The circuitry of the inventive flow meter is adapted for seamless integration into existing alarm systems known to those of skill in the art. In alternate embodiments, such a circuit board may be placed in an existing meter cabinet.

Referring now to 7a and 7b as well FIGS. 1 and 2, there is shown a flow chart of the installation and set-up process for installing optical sensor 114 on meter 100 and calibrating the electrical portion of the system 300 (FIG. 3), generally at reference numbers 700a, 700b, respectively.

Figure 7A:
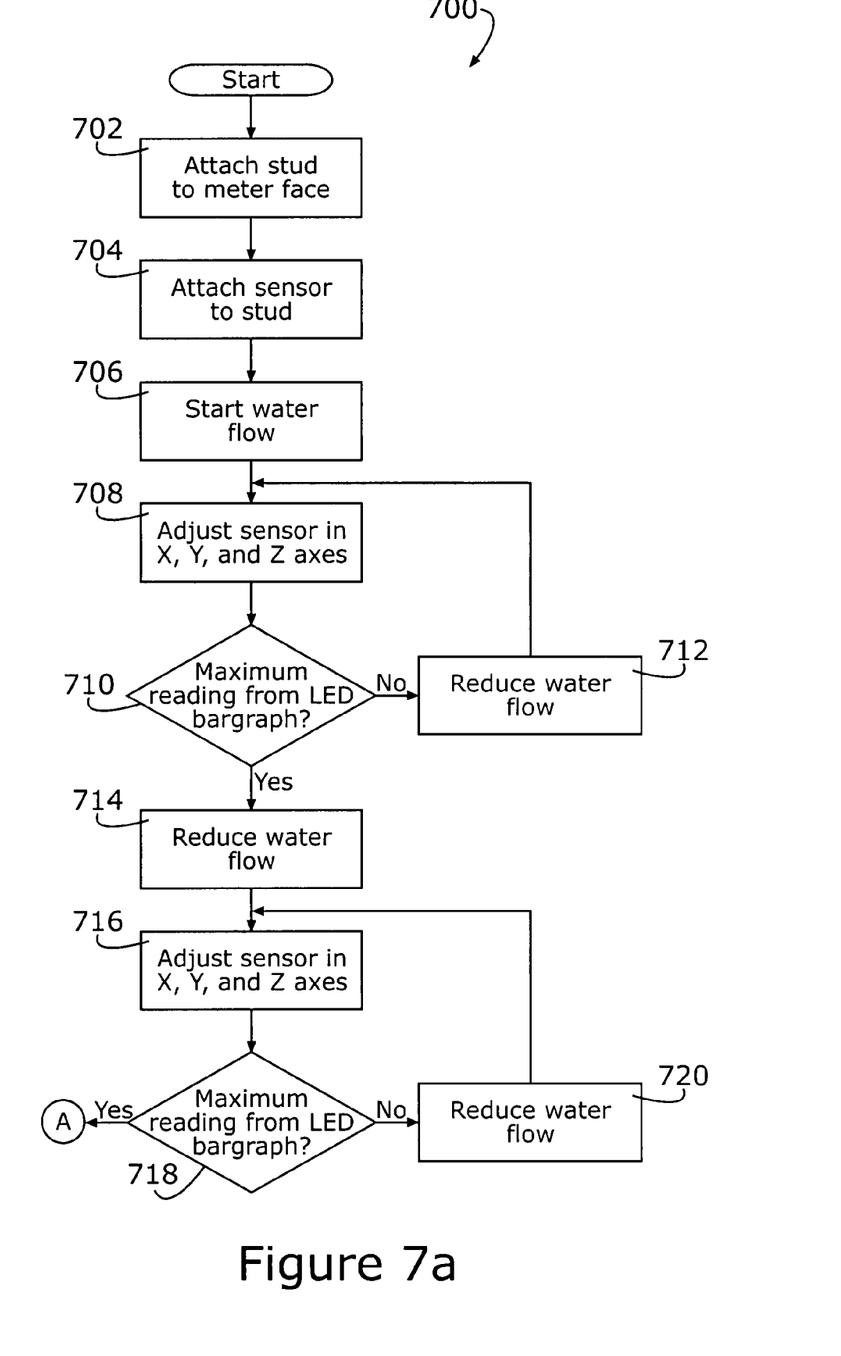
FIGS. 7a and 7b taken together are a flowchart depicting the steps of installing and calibrating the flow monitoring system to monitor excessive flow.

The user or installer first attaches threaded stud 106 to meter 100, step 702. Any appropriate technique such as soldering, welding, gluing, fastening by a hook-and-loop fastening arrangement, magnetically fastening, bolting, clamping, or otherwise attaching threaded stud 106 to meter 100 may be used. Threaded stud 106 must be mounted in such a manner that dial 102 on meter face 108 is not obstructed.

After threaded stud 106 is attached to meter 100, step 702, optical sensor assembly 114 is attached thereto using slotted bracket 116. A slot in the transverse portion of slotted bracket 116 is placed over threaded stud 106 and loosely secured thereto with wing nut 118 or another suitable fastener, step 704. Slotted bracket 112 may rotate on threaded stud 112 as well as move inward and outward along the slot thereby providing adjustment along the x-y axes. Slotted optical sensor 114 is attached to the upright portion of slotted bracket 116 using screw 122 and, when required, an appropriate fastener such as a nut, not shown. Movement of slotted optical sensor 114 along the upright portion of slotted bracket 112 allows adjustment along the z-axis.

Water flow is next initiated, step 706. Water flow is typically initiated by opening a faucet in the piping system downstream from meter 100. With water or other fluid flowing through meter 100, the position of optical sensor assembly 114 relative to small flow indicator 104 may be adjusted and optimized, step 708. It is important to note that before final sensor adjustment is made that large, sweeping hand 112 is not positioned between the sensor assembly 114 and small flow indicator needle or wheel 104. If sweeping hand 112 is so positioned, water should be allowed to flow until small flow indicator 104 is unobstructed by sweeping hand 112. Otherwise, optimum adjustment of sensor assembly 114 is difficult or impossible potentially resulting in reduced sensitivity of the inventive flow detector to water flow through meter 100.

This is accomplished by rotating and sliding slotted bracket 116 on stud 106 and moving sensor assembly 114 up and down along the upright portion 120 of slotted bracket 116. LED bar graph 308 (FIG. 3) may be used to optimize the position of optical sensor 114 with respect to small flow indicator 104 of meter 100.

A maximum indication from LED bar graph 308, typically a full-scale display (i.e., all bars illuminated), indicates a good alignment of optical sensor assembly 114 with small flow indicator 104. If a maximum reading (i.e., most bars illuminated) is not obtained, step 710, optical sensor assembly 114 is readjusted, step 708.

If a maximum reading of LED bar graph 308 is obtained, however, step 710, water flow is reduced, step 714, and optical sensor assembly 114 is again adjusted in the x-, y- and z-axes, step 716.

Figure 7B:
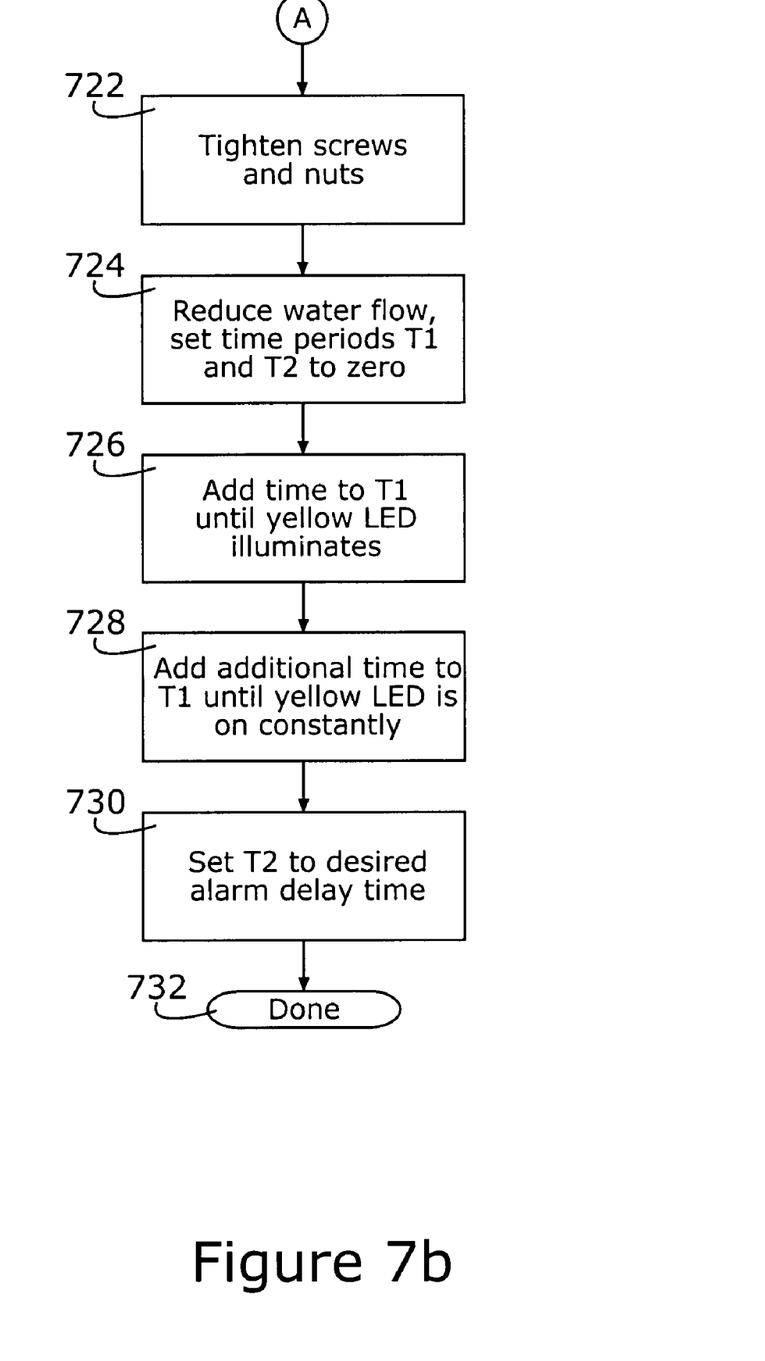

If a maximum reading is still not obtained, step 718, the optical sensor assembly adjustment process is repeated, step 716.

Once the adjustment of optical sensor assembly 114 is optimized, step 718, all hardware securing optical sensor assembly 114 to stud 106 is tightened, step 722. Mounting hardware includes mounting screw 122, wing nut 118, and any other additional or substitute hardware, not shown.

Water flow is adjusted to the flow rate for which an alarm signal is desired and both T1 and T2 times are set to zero, step 724. T1 and T2 times are set using dip switches 316-316h and 326a-326h, respectively. Time is incrementally added to T1 using DIP switches 316a-316h until yellow LED 320 flashes intermittently, step 726. Additional time is added to T1 until yellow LED 320 is illuminated continuously, step 728.

Delay time T2 is set to a desired multiple of T1 or to any other time period the user wishes to delay reporting an alarm when the current flow conditions are encountered, step 730. Typical considerations made in selecting a T2 delay time are based on water flow events encountered in the water distribution system being monitored. For example, devices such as icemakers draw water at random time intervals. In heating system utilizing a boiler, make-up water may occasionally be drawn from the water distribution system. T2 is adjusted to prevent an alarm condition being reported under such occurrences.

Once the installation and calibration procedure 700 is complete, step 732, the novel flow monitor may be considered in service.

Figure 8:
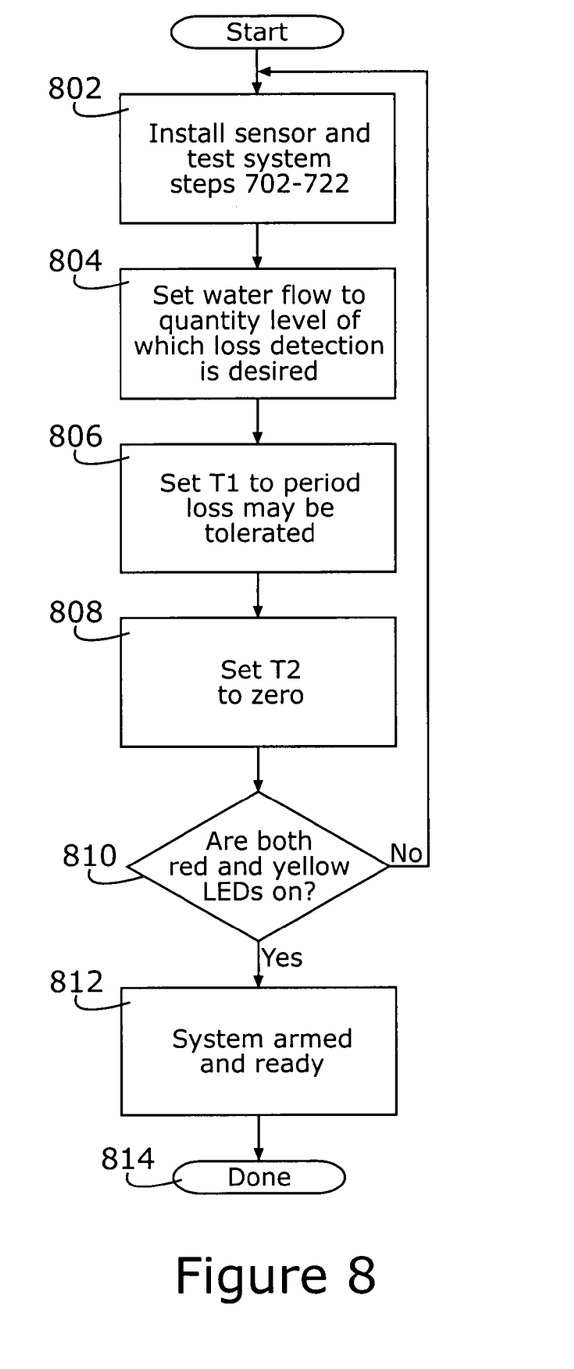
FIG. 8 is a flowchart depicting the steps of installing and calibrating the flow monitoring system to detect absence of flow.

As discussed hereinabove, the novel flow monitoring system may also be used to detect lack of fluid flow (i.e., underflow). Refer now again to FIGS. 1 and 2. Referring now also to FIG. 8, there is shown a flow chart of the installation and set-up process for installing optical sensor 114 on meter 100 and calibrating the electrical portion of the system 300 (FIG. 3), generally at reference number 700.

Once steps 702 to 722 have been performed as described in detail hereinabove, step 802, the water flow is set to the desired flow, the absence of which is to be detected, step 804. Time period T1 is next set to the maximum time that the absence of flow is tolerable, step 806. Next, time period T2 is set to zero, step 808.

If, after setting periods T1 and T2, steps 806, 808, respectively, both red LED 324 (FIG. 3) and yellow LED 320 (FIG. 3) are illuminated, step 810, the flow monitoring system is armed and ready, step 812, and the set-up process is complete, step 814. Relay 328 (FIG. 3) is now energized.

If, however, both red LED 324 and yellow LED 320 are not illuminated, step 810, then step 802 is repeated until optical sensor assembly 114 (FIG. 1) is properly installed and adjusted.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A system for non-intrusively monitoring flow in a fluid distribution system having a fluid flow meter associated therewith, comprising:
   a) a sensor assembly adapted for adjustable placement proximate a meter in a fluid distribution system, said sensor assembly adapted to generate an electrical signal representative of a flow of fluid through said meter; and
   b) an electrical circuit operably attached to said sensor assembly for receiving said electrical signal, comprising:
      i) means for measuring time;
      ii) means for indicating a magnitude of said electrical signal; and
      iii) means for generating an alarm signal based on a predetermined relationship of flow and time.

2. The system for non-intrusively monitoring flow in a fluid distribution system as recited in claim 1, wherein said sensor assembly comprises an optical sensor assembly.

3. The system for non-intrusively monitoring flow in a fluid distribution system as recited in claim 2, wherein said sensor assembly is removably, adjustably attached to said meter.

4. The system for non-intrusively monitoring flow in a fluid distribution system as recited in claim 3, wherein said meter comprises a least flow dial or wheel and said sensor assembly is adjusted to monitor primarily said least flow dial or wheel.

5. The system for non-intrusively monitoring flow in a fluid distribution system as recited in claim 2, wherein said optical sensor assembly comprises a light-emitting element and a photosensitive element.

6. The system for non-intrusively monitoring flow in a fluid distribution system as recited in claim 5, wherein said light-emitting element comprises an IRLED and said photosensitive element comprises a phototransistor.

7. The system for non-intrusively monitoring flow in a fluid distribution system as recited in claim 5, wherein said light-emitting element and said photosensitive element are provided in a single mechanical package.

8. The system for non-intrusively monitoring flow in a fluid distribution system as recited in claim 1, wherein said means for measuring time comprises at least one selected from the group: a re-triggerable one-shot multivibrator (i.e., one-shot), and a delay timer.

9. The system for non-intrusively monitoring flow in a fluid distribution system as recited in claim 8, wherein at least one selected from the group: a re-triggerable one-shot multivibrator, and a delay timer comprises a programmable device wherein a time associated therewith may be externally preset.

10. The system for non-intrusively monitoring flow in a fluid distribution system as recited in claim 9, wherein said programmable device may be externally preset using a binary device.

11. The system for non-intrusively monitoring flow in a fluid distribution system as recited in claim 10, wherein said binary device comprises a bank of electrical switches, each switch thereof representing a particular binary value.

12. The system for non-intrusively monitoring flow in a fluid distribution system as recited in claim 11, wherein said bank of electrical switches comprises a bank of dip switches.

13. The system for non-intrusively monitoring flow in a fluid distribution system as recited in claim 1, wherein said means for indicating a magnitude of said electrical signal comprises an LED bar graph display.

14. The system for non-intrusively monitoring flow in a fluid distribution system as recited in claim 1, wherein said means for generating an alarm comprises a relay.

15. The system for non-intrusively monitoring flow in a fluid distribution system as recited in claim 14, wherein said relay comprises at least one normally open contact and at least one normally closed contact.

16. The system for non-intrusively monitoring flow in a fluid distribution system as recited in claim 10, wherein said system monitors an excessive flow during a time determined by a setting of said binary device.

17. The system for non-intrusively monitoring flow in a fluid distribution system as recited in claim 10, wherein said system monitors an absence of flow during a time determined by a setting of said binary device.

* * * * *